United States Patent Office 3,530,745
Patented Sept. 29, 1970

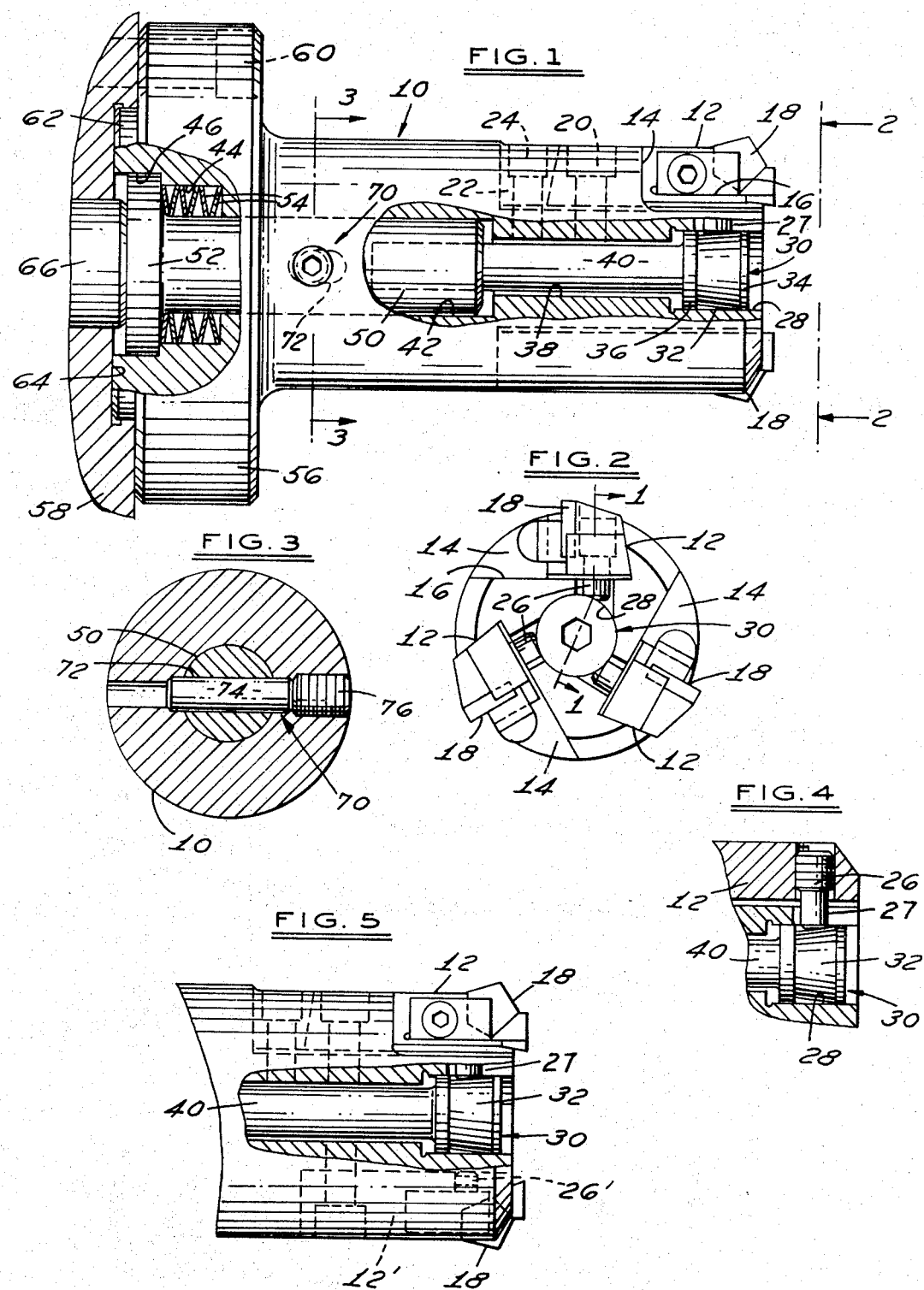

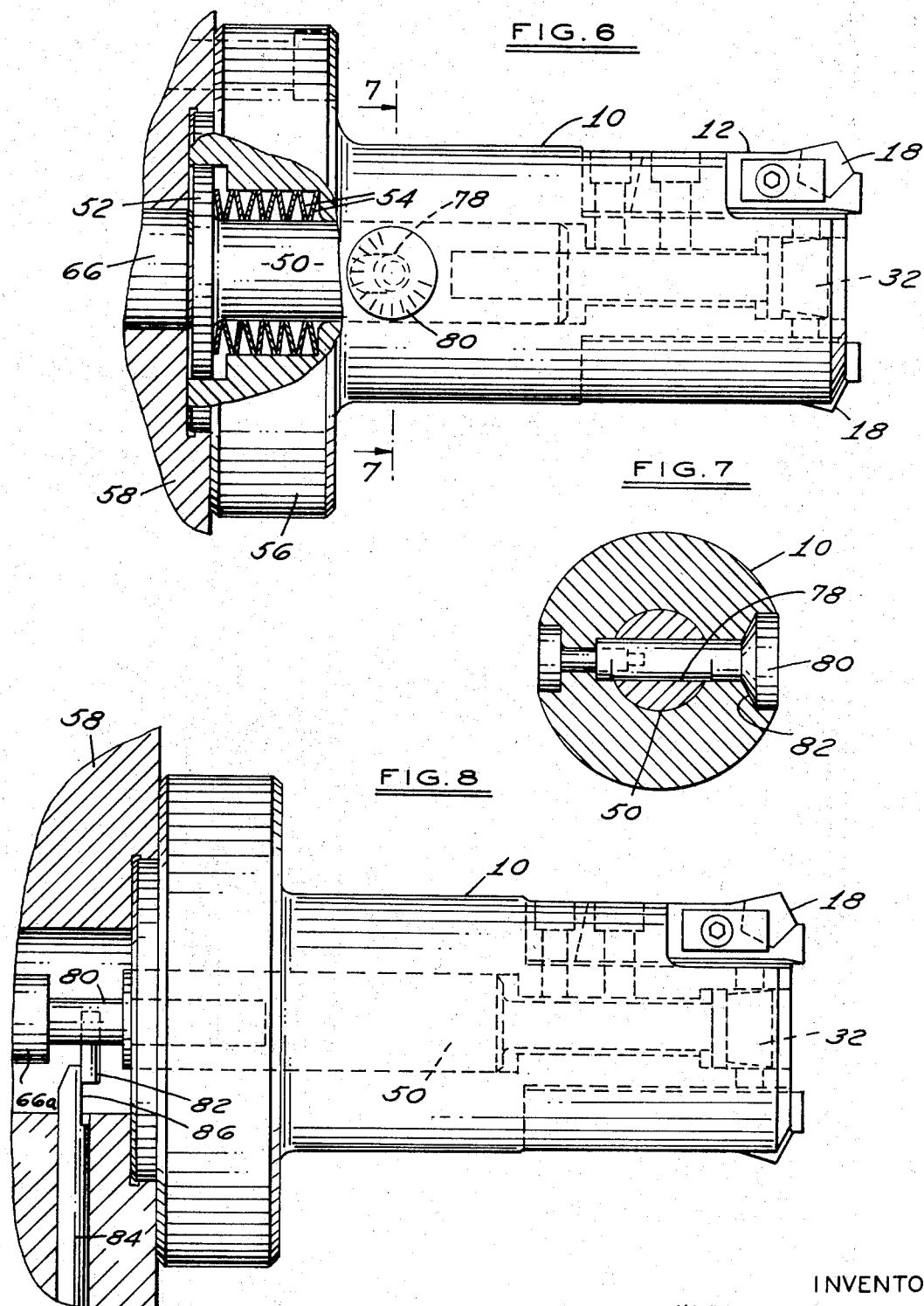

3,530,745
RETRACTABLE CAM SET CUTTER
Victor Milewski, Birmingham, Mich., assignor to The Valeron Corporation, a corporation of Michigan
Filed Mar. 27, 1967, Ser. No. 626,087
Int. Cl. B23b 29/034
U.S. Cl. 77—58                                     6 Claims

ABSTRACT OF THE DISCLOSURE

A rotary cutting tool including cutters which are radially adjustable by means within the tool and operable from the retained end thereof for changing the cutting diameter of the tool during its operating cycle. The present embodiment comprises a spindle-mounted multiple cutter boring bar adapted for simultaneous radial extension or retraction of the cutters while the boring bar is rotating.

BACKGROUND OF THE INVENTION

This invention relates to cutting tools and more particularly to boring and like tools which have radially adjustable cutters for providing a variable diameter cutting tool.

Prior variable diameter cutting tools include a holder with the cutters circumferentially spaced on the outer periphery, near one end, and have an axially adjustable member in a bore in the holder that has a conical taper providing a cam surface which is engaged by either the cutters or members holding replaceable cutters so that they are radially adjusted, in unison, as the axially adjustable member is moved in the bore. Although this affords a simple means of providing a variable diameter tool, the adjustment feature is obtainable only by stopping the tool and making the necessary adjustments. Consequently, it is not available while the tool is in service.

There is need for an adjustable diameter cutting tool that allows changes to be made while the tool is being used so that; for example, cutters can be retracted to avoid tool marks in being withdrawn from the work; cutters can be inserted in a bore and expanded to provide a finished cut while being retracted; a rough cut can be made during the initial boring stroke and a finished cut taken as the tool is retracted; larger or similar diameter cuts can be made at the ends of the bore or other variations in bore diameter can be provided during the operating cycle.

These and other objects and advantages are sought to be obtained by the present invention as hereinafter described.

SUMMARY OF THE INVENTION

The present invention relates to variable diameter cutting tools of the type mentioned and wherein the cutting diameter of the tool can be changed by remotely operable means engaged with the adjustment means for the cutters provided in the work tools.

In the embodiments of the invention hereinafter described in greater detail, an adjustment member with a taper, which provides a cam surface, is used to actuate resiliently mounted cutters. An extension is provided on the inner end of the adjustable member through to the mounted end of the tool and spring washers are used to bias the extension and the adjustment member so that the cutters are held in a radially extended position. A power operated piston or like member is provided in the tool holder and is aligned with the extension of the adjustment member to actuate it and cause the cutters to retract when and as desired.

Relatively fixed and adjustable stops are provided to enable extending and retracting the cutters to different desired positions.

In addition, both remotely controlled adjustable cutters and those having separate adjustment features may be used together for providing an even more versatile tool.

DESCRIPTION OF THE DRAWINGS

FIG. 1 is a side elevation of a cutting tool embodying the feature of this invention with certain parts broken away and shown in cross-section.

FIG. 2 is an end elevation of the cutting tool of the first drawing figure, as seen in the plane of line 2—2.

FIG. 3 is a sectional view taken along line 3—3 of FIG. 1.

FIG. 4 is a detail sectional view of a fragmentary part of the tool showing one of the cutter adjustment features.

FIG. 5 is a fragmentary side elevation of the front end of a modified cutting tool showing a different arrangement of cutters.

FIG. 6 is a side elevation of the cutting tool of FIG. 5 showing a different adjustment feature for the axially adjustable member.

FIG. 7 is a sectional view of the adjustment feature shown in FIG. 6 taken along line 7—7.

FIG. 8 is a side elevational view of a cutting tool incorporating the features of this invention and having an adjustment limit stop exterior of the tool per se.

DESCRIPTION OF THE PREFERRED EMBODIMENTS

The cutting tool of this invention includes a holder 10 having cartridges 12 retained in peripheral recesses 14 formed to provide seats 16 for the cartridges which are parallel to the axial line of the holder and dispose the replaceable cutting inserts 18 in the cartridges beyond the periphery of the holder for boring and like cutting purposes.

Each of the cartridges 12 is retained by a fastener 20, near its inner end and in threaded engagement with the holder, and is adjustable longitudinally by a cam wedge 22 retained and adjusted by another fastener 24.

The cartridges are so formed and retained as to afford limited resilient radial adjustment at their outer ends and for such purpose each cartridge 12 includes an individually adjustable set screw 26 near the cutting insert 18 engaging a cam follower 27 extending radially inward and intersecting an axial bore 28 in the holder 10 within which is mounted an axially adjustable member 30 having a taper providing a cam surface 32 engaged by the inner end of the follower 27. The taper on member 30 is towards its inner end so that the cartridges, and accordingly the cutting inserts 18, are fixed radially outward as the member is retracted in the bore and radially inward as the member is moved axially outward.

In addition to the bore hole 28 in the outer end of the holder 10, within which is received the cam surfaced cutter actuating part of member 30, suitably formed with cylindrical sections 34 and 36 on each side of the taper to guide in the bore hole, the holder is formed to include an extended passageway 38 within which the shank 40 of the cam surfaced actuator is concentrically disposed. It is also formed to include an axial passageway 42 of larger diameter with further enlarged sections 44 and 46 near the retained end of the holder receptive of an extended cylindrical shaped member 50 with a terminal annular flange 52 and a plurality of spring washers 54 received in the space 44 just behind the flanged end thereof.

The member 50 is received through the retained end of the holder 10 and has the shank of the cutter actuating part 30 received in threaded engagement with it and is accordingly made an extension of the actuating member.

The tool holder includes a flange 56 at its retained end which is held to a boring head 58 as by bolt fasteners 60. For centering purposes, it also includes a terminal ring 62 that registers with a recess 64 provided in the boring head. This also assures alignment of a remotely controlled power operated actuator 66 in the head, with the terminal flange 52 of the member 50 to which the cutter actuating member 30 is assembled.

The power operated actuator 66 in the head acts against the resistance of the spring washers 54 to move the cutter actuating members 50 and 30 axially outward to retract the cutters 10 radially, and the spring washers serve to hold the actuating members in a retracted position which disposes the cutters radially outward at all other times.

As shown in FIGS. 1 and 3, a transverse slot 72 is provided in the member 50 and a cross pin 74 supported in the side walls of the holder 10 extends through the slot with a set screw 76 to seat the pin. The cross pin 74 serves as a stop for the member 50 in its cutter extending position and the effective cutting diameter determined thereby may be established by individual adjustment of the cartridge set screws 26. A further adjustment may be provided by having the cross pin include an eccentric center portion 78 within the slot. The latter feature is shown in FIGS. 6 and 7 wherein the eccentric cross pin is provided with a calibrated head 80 received in a seat 82 to indicate the pin position adjustment.

FIG. 2 shows one of several arrangements of cutters which may be used with the proposed tool. In this particular instance three cutters 18, within their cartridges 12, are circumferentially spaced on the outer periphery of the holder and each includes the previously described set screw feature for adjustment by the cam surfaced member 30 in the center bore so that they are all positioned in unison. The cutters are normally extended outwardly and may be retracted either after the boring stroke, to prevent tool marks when withdrawn, or before so that they can make a finish cut while they are being withdrawn from the work. They may also be used to cut a bore hole while retracted and then extended for a finished cut while being withdrawn from the work piece.

An alternative arrangement for a combination roughing and finishing tool is as shown in FIG. 5. In this particular drawing a ninety degree section is taken through the tool to show an embodiment having certain cartridge members 12' which have their adjustment screws 26' engaging the cartridge seat for adjustment independent of the cam surfaced actuating part 30, while others would be as previously described. Preferably, a pair of fixed adjustment cartridges would be used with a pair of relatively adjustable cartridges, each pair being diametrically opposed, and the relative adjustment cartridges would be made to extend their cutters beyond the cutting diameter of the fixed cartridges so that they might be retracted during the roughing cut and extended for the finished cut.

FIG. 8 shows an external stop arrangement for the cutting tool wherein the power actuator includes a piston rod 80 engaged with the operative member 50 of the tool and has a pin 82 provided in the rod to register with stop 84 provided in the head to which the tool holder is secured. Although the stop 84 is shown to include a flat side 86 receptive of the pin 82, it will be appreciated that it might be otherwise and such as includes an eccentric allowing for limited adjustment fore and aft.

From the foregoing, it will be appreciated that the cutting tool of this invention makes use of an operative member for actuating a cam surfaced or like member controlling the cutting diameter of the tool and which may be used during the operating cycle of the tool. The cutting tool does not have to be removed from the head or the work piece or even stopped to effect the change. The cutting diameter may be changed before, after or even during either the advance or retracting stroke of the tool as desired for different purposes.

While several preferred embodiments have been shown and described in detail, other modifications and improvements may be provided within the scope of the invention as defined in the following claims.

What is claimed is:

1. In a cutting tool including a holder having at least one radially adjustable cutter provided on the outer periphery thereof, and means in the holder for adjusting the radial disposition of the cutter to provide an adjustable cutting diameter for the tool, the improvement comprising;
   remotely operable means engageable with the cutter adjusting means in the holder, means for actuation thereof during the operating cycle of the cutting for effecting a change in the cutting diameter of the tool, and an adjustable stop determinative of a cutting diameter adjustment afforded the cutter disposed for engagement by one of said remotely operable means and cutter adjusting means.

2. The improvement of claim 1, including a plurality of cutters circumferentially spaced on the outer periphery of the holder, and having less than all thereof radially adjustable by said adjusting means.

3. The improvement of claim 2, those cutters which are radially adjustable by said adjusting means having terminal adjustment positions radially less and greater than the others thereof.

4. In a cutting tool including a holder having at least one radially adjustable cutter provided on the outer periphery thereof, and means in the holder for adjusting the radial disposition of the cutter to provide an adjustable cutting diameter for the tool, the improvement comprising;
   remotely operable means engageable with the cutter adjusting means in the holder, means for actuation thereof during the operation cycle of the cutting tool for effecting a change in the cutting diameter of the tool, and relatively fixed stops disposed for engagement by one of said remotely operable means and cutter adjusting means and determinative of the different terminal adjustment positions afforded the cutter.

5. The improvement of claim 4, the relatively fixed stops including a guide slot and cross pin cooperatively formed and disposed in said holder.

6. In a cutting tool including a holder having at least one radially adjustable cutter provided on the periphery thereof, and means in the holder for adjusting the radial disposition of the cutter to provide an adjustable cutting diameter for the tool, the improvement comprising;
   remotely operable means engageable with the cutter adjusting means in the holder, means for actuation thereof during the operating cycle of the cutting tool for effecting a change in the cutting diameter of the tool, and relatively fixed stops disposed for engagement by one of said remotely operable means and cutter adjusting means and determinative of the different terminal adjustment positions afforded the cutter, the relatively fixed stops including a guide slot and cross pin cooperatively formed and disposed in said holder, the guide slot being provided in the cutter adjusting means and the cross pin being disposed through the holder and having an eccentric portion received in the guide slot for relative adjustment of the stops provided thereby.

References Cited

UNITED STATES PATENTS

| | | | |
|---|---|---|---|
| 1,530,593 | 3/1925 | Calkins | 77—58 |
| 3,146,641 | 9/1964 | Benjamin et al. | 77—58 |
| 3,146,648 | 9/1964 | Ortet et al. | 77—58 |
| 3,269,222 | 8/1966 | Bullard | 77—58 |
| 3,274,861 | 9/1966 | Czubak | 77—58 |
| 3,276,101 | 10/1966 | Plein | 77—58 |
| 3,296,898 | 1/1967 | Osborn | 77—58 |
| 1,946,753 | 2/1934 | Moberley | 77—58 |
| 2,207,067 | 7/1940 | Patscheider | 77—58 |
| 2,350,778 | 6/1944 | Lang | 77—58 |
| 3,121,350 | 2/1964 | Warsewa et al. | 77—58 |

GERALD A. DOST, Primary Examiner

U.S. Cl. X.R.

77—3